Figure 6:
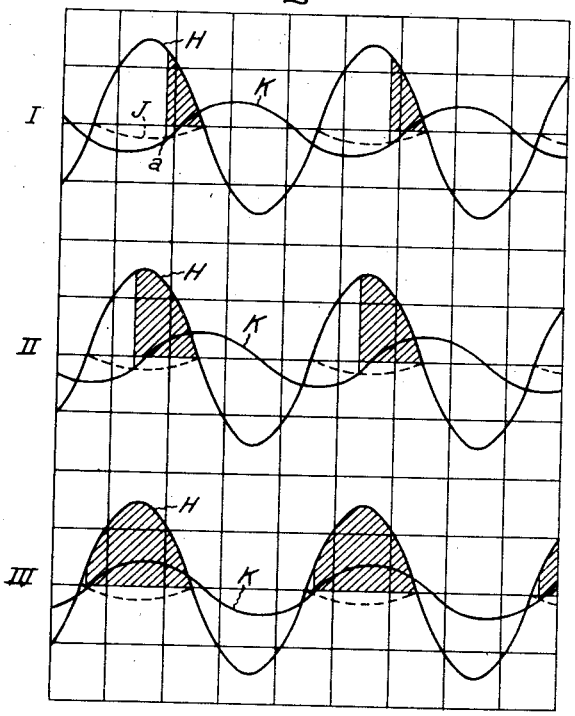

May 16, 1939.  W. E. JACOBSEN  2,158,871
REGULATING SYSTEM
Filed July 24, 1936  2 Sheets-Sheet 1
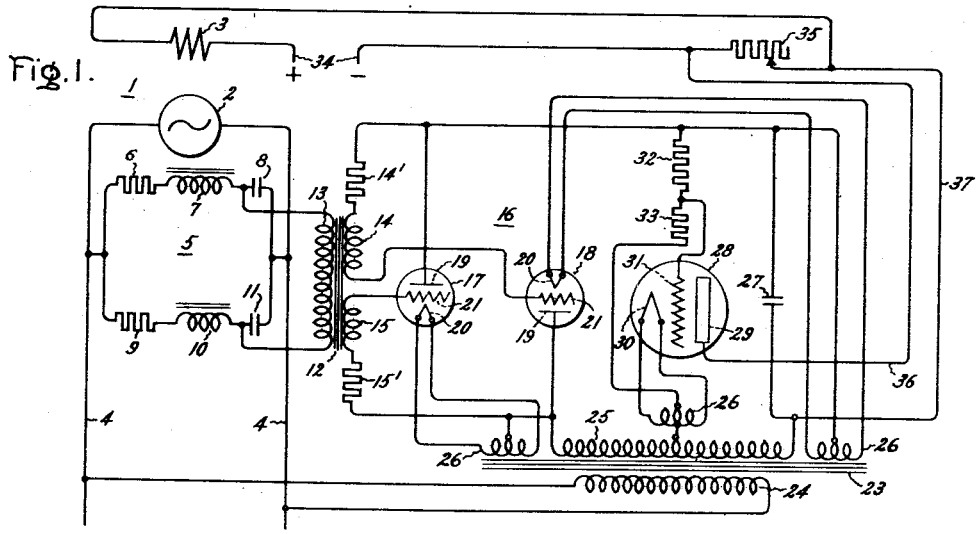
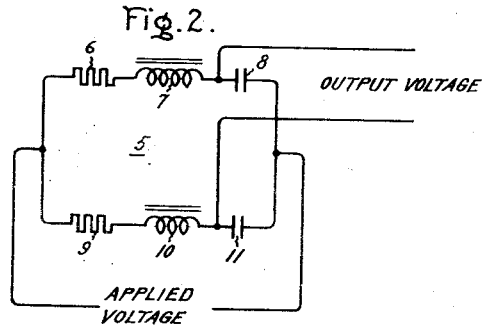
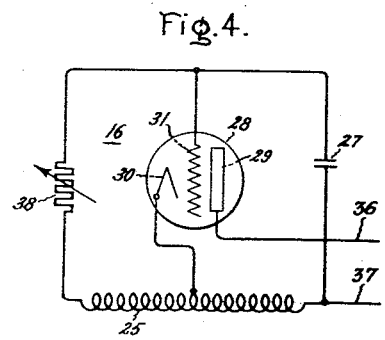
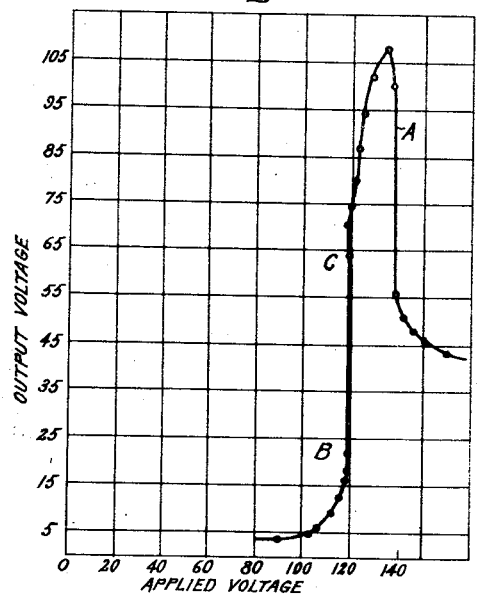
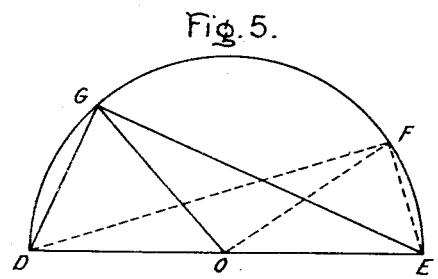
Inventor:
William E. Jacobsen.
by Harry E. Dunham.
His Attorney.

May 16, 1939.  W. E. JACOBSEN  2,158,871
REGULATING SYSTEM
Filed July 24, 1936  2 Sheets-Sheet 2

Inventor:
William E. Jacobsen,
by Harry E. Dunham
His Attorney.

Patented May 16, 1939

2,158,871

UNITED STATES PATENT OFFICE 2,158,871

REGULATING SYSTEM

William E. Jacobsen, Schenectady, N. Y., assignor to General Electric Company, a corporation of New York Application July 24, 1936, Serial No. 92,378

16 Claims. (Cl. 171—119)

My invention relates to regulating systems and more particularly to electric valve regulating systems for dynamo-electric machines.

Heretofore there have been devised numerous arrangements for controlling electric circuits in accordance with the voltage or other variable quantity of an associated circuit. As concerns regulating system for dynamo-electric machines, various types of electric valve regulators have been devised to effect rapid and precise control without involving the use of apparatus which is complex in construction and operation. There has been evidenced a decided need for an electric valve regulating system which embodies a high degree of sensitivity to small changes in the variable condition of the circuit to be controlled and which is susceptible of long life without necessitating frequent renewal or replacement of parts. Furthermore, it is important that the operation of the regulator be practically instantaneous and free from hunting or undesirable transient conditions.

It is an object of my invention to provide an electric valve regulator which has the above mentioned characteristics.

It is another object of my invention to provide a new and improved electric valve regulator which is highly sensitive to small changes in voltage and which responds quickly to predetermined changes in the voltage or other variable condition of the system to be regulated.

It is a further object of my invention to provide a new and improved electric valve voltage regulator for dynamo-electric machines which effects rapid and precise control of the excitation of the machines in response to small changes in terminal voltage.

In accordance with the illustrated embodiment of my invention, a voltage regulating system is provided for controlling the excitation of a dynamo-electric machine in accordance with the terminal voltage of the machine. The voltage regulating system comprises a highly sensitive non-linear resonant network of the bridge type which is energized in accordance with the terminal voltage of the dynamo-electric machine and which effects control of an electric valve by means of an interposed phase shifting circuit. The output circuit of the electric valve is associated with the field circuit of the dynamo-electric machine so that the field current varies inversely with the output current of the electric valve. The interposed phase shifting circuit is of the impedance type in which a pair of oppositely disposed electric valves of the high vacuum type function as a resistance element to effect the desired phase shift in response to the output voltage of the non-linear network.

Figure 7:
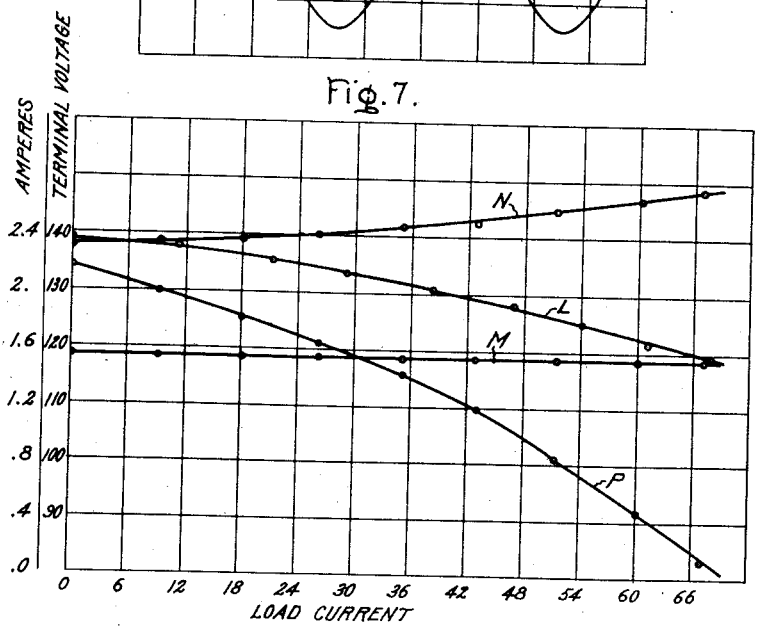

For a better understanding of my invention, reference may be had to the following description taken in connection with the accompanying drawings and its scope will be pointed out in the appended claims. Fig. 1 diagrammatically represents an embodiment of my invention as applied to an electric valve voltage regulating system for controlling the excitation of a dynamo-electric machine. Fig. 2 is a simplified circuit of the non-linear resonant network shown in Fig. 1, and Fig. 3 represents certain operating characteristics of the non-linear resonant network. Fig. 4 is a simplified diagrammatical representation of the phase shifting circuit employed in Fig. 1 and Figs. 5 and 6 represent certain operating characteristics of the phase shifting circuit shown in Fig. 4. Fig. 7 represents certain operating characteristics of the voltage regulating system shown in Fig. 1.

Referring now to Fig. 1 of the accompanying drawings, my invention is diagrammatically shown as applied to a voltage regulating system for controlling the excitation of a dynamo-electric machine 1 having an armature winding 2 and a field winding 3. The armature member 2 is connected to an alternating current circuit 4. In order to provide a sensitive circuit responsive to a predetermined controlling influence, such as voltage, I employ a circuit of the non-linear resonant type and, by way of example, I have shown a non-linear resonant network 5 of the bridge type including two parallel branches. The upper branch of the non-linear resonant network 5 includes a serially-connected resistance 6, a saturable inductance 7 and a capacitance 8, while the lower branch includes a serially-connected resistance 9, a saturable inductance 10 and a capacitance 11. The common connections of the parallel branches are connected to the alternating current circuit 4.

To control the energization of the field winding 3 of the dynamo-electric machine 1 in accordance with an electrical condition such as the voltage of the alternating current circuit 4, the output voltage of the non-linear resonant network 5 is impressed on a primary winding 13 of a transformer 12. The transformer 12 is also provided with secondary windings 14 and 15, the output voltages of which are employed to control a phase shifting circuit 16. The phase shifting circuit 16 is of the impedance type and includes a pair of oppositely disposed electric valves 17 and 18 of the high vacuum type and each including an anode 19, a cathode 20 and a control member 21. Resistances 14' and 15' are connected in the control member circuits for electric valves 17 and 18 and serves as current limiting resistances. A transformer 23 having a primary winding 24 and secondary windings 25 and 26 may be energized from any suitable source of alternating current and in the arrangement shown in Fig. 1 is illustrated as being energized from the alternating current circuit 4. The secondary windings 26 are employed as sources of current for heating the cathodes of the associated electric valves. Secondary winding 25 of transformer 23 is provided with terminal connections and a connection electrically intermediate the terminal connections. Electric valves 17 and 18 are connected in series relation with a reactance element such as a capacitance 27. Cathode 20 of electric valve 17 and the anode 19 of electric valve 18 are connected to the left-hand terminal of secondary winding 25 of transformer 23, and the lower plate of capacitance 27 is connected to the right-hand terminal of secondary winding 25.

The output potential which is supplied by the phase shifting circuit 16, and which is variable in phase, is employed to control the conductivity of electric valve 28. Electric valve 28 is preferably of the type employing an ionizable medium such as a gas or a vapor, and is provided with an anode 29, a cathode 30 and a control member 31. A resistance 32 serves to connect the control member 31 of electric valve 28 to the common juncture of the capacitance 27 and the anode 19 of electric valve 17 and the cathode 20 of electric valve 18. A resistance 33 is interposed between the lower terminal of the resistance 32 and the cathode 30 of electric valve 28. The secondary winding 25 of transformer 23 also serves as a source of alternating voltage which is rectified by the electric valve 28 to supply a direct current which is employed to control the net or resultant current which flows in the field winding 3 of dynamo-electric machine 1.

The excitation of the dynamo-electric machine 1 may be controlled in accordance with any of the arrangements well known in the art. An auxiliary field winding may be associated with the field winding 3 to control the resultant excitation of the dynamo-electric machine 1 or the excitation of the machine 1 may be controlled by controlling the current supplied to the field winding 3. Any suitable source of direct current, such as a separate exciter, may be employed to energize the field winding 3. By way of example, I have shown the field winding 3 as being energized from a source of direct current 34. To control the net or resultant value of current which flows in the field winding 3, I provide a current controlling means, such as a rheostat or a variable resistance 35, which is connected to the electric valve 28 through conductors 36 and 37 and the right-hand portion of winding 25. The resistance 35 is energized by the electric valve 28 and is associated with the field winding circuit in a manner so that the current in the field winding 3 varies inversely with the output current of the electric valve 28.

Fig. 2 is a simplified diagrammatic representation of the non-linear resonant network 5 shown in Fig. 1 and corresponding elements have been assigned like reference numerals.

Fig. 4 represents a simplified arrangement of the phase shifting circuit 16 shown in Fig. 1, and corresponding elements have been assigned like reference numerals. A variable resistance 38 is employed to represent an element which serves the same purpose as the electric valves 17 and 18 shown in the phase shifting circuit 16 of Fig. 1. The general principles of operation of the embodiment of my invention diagrammatically illustrated in Fig. 1 of the drawings may be best explained by considering separately the operating characteristics of the several elements employed in the system. In connection with the non-linear resonant network 5 shown in Fig. 2, it is to be noted that this circuit is of the type disclosed and broadly claimed in U. S. Patent No. 1,921,788 granted August 8, 1933 on an application of Chauncey G. Suits and assigned to the assignee of the present application. As will be well understood by those skilled in the art, by the proper choice of the elements in the two parallel branches of the non-linear network the output voltage of this network may be made to assume the characteristic represented by curve A in Fig. 3. Curve A of Fig. 3 represents the effective or rms value of the output voltage as a function of the rms value of the applied voltage. Furthermore, by the proper choice of the elements of the parallel branches of the network, the network may be made to supply the same output voltage for increasing or decreasing applied voltages. It is to be understood that the critical region or the region of rapid change in the output voltage as illustrated by the portion BC of curve A is chosen so that it is substantially the same as the terminal voltage of the alternating current circuit 4 which is to be maintained by the dynamo-electric machine 1. To effect this sensitive operation, the parallel branches of the non-linear resonant network 5 are chosen so that the branches become resonant at slightly different voltages. For example, by employing a saturable inductance 7 having a larger number of turns than the saturable inductance 10, the upper branch of the non-linear network 5 may be made to resonate at a slightly lower voltage than the lower branch. By virtue of this feature, the output voltage of the network 5 will be large so long as only one of the branches is resonating. However, as soon as the voltage of the alternating current circuit 4 increases to a value corresponding to the critical resonating voltage of the other branch, the output voltage will be substantially decreased. This highly selective and abruptly varying output characteristic of the non-linear bridge is of importance in obtaining an electrical quantity to effect selective and rapid control of the phase shifting circuit 16. In explaining the operation of the phase shifting circuit 16, it should be noted that the electric valves 17 and 18 shown in phase shifting circuit 16 of Fig. 1 serve substantially the same purpose as the variable resistance 38 shown in the phase shifting circuit 16 of Fig. 4. The electric valves 17 and 18 are oppositely disposed relative to each other and function as a full wave rectifier. The secondary windings 14 and 15 of transformer 12 are connected so that the potentials impressed by these windings on control members 21 of electric valves 18 and 17, respectively, are substantially 180° out of phase with the voltage impressed on the anodes 19 of these valves. Since these valves are of the high vacuum type, the average current which these valves conduct may be controlled by control of the magnitude of the voltage impressed on the control members 21. As will be well understood by those skilled in the art, as the potentials impressed on the control members become less negative the current conducted by these valves increases or, in other words, the resistance which these valves offer to the associated circuit decreases. The voltages of the secondary windings 14 and 15 of transformer 12 are chosen so that for output voltages of the non-linear bridge 5 corresponding to voltages above a predetermined critical voltage of the alternating current circuit 4, the potentials impressed on the control members 21 become sufficiently negative to render the electric valves 17 and 18 completely non-conductive. It will be well understood by those skilled in the art that as the resistance offered by electric valves 17 and 18 becomes very large the voltage impressed on the control member 31 of electric valve 28 becomes more nearly in phase with the voltage impressed on the anode 29.

Referring to Fig. 5, the vector DE may be considered to represent the voltage appearing across the winding 25 and the vector DO may be employed to represent the voltage appearing across the left-hand portion of the secondary winding 25. When the effective value of the resistance offered by electric valves 17 and 18 is relatively high, the voltage impressed on the control member 31 of electric valve 28 may be represented by the vector OF and when the effective value of the resistance offered by these valves is relatively small the voltage impressed on the control member 31 may be represented by the vector OG. It will be readily understood that as the effective value of the resistance of these valves decreases, the voltage impressed on the control member 31 of electric valve 28 is retarded in phase displacement relative to the voltage impressed on the anode 29 so that the conductivity of the electric valve 28 is decreased.

In electric valves, such as valve 28, which employ ionizable mediums, the control members may be employed to control the average current conducted by the electric valves by causing the control members to initiate the electrical discharges at predetermined times during the positive half cycles of anode potential. The operating characteristics of electric valves of the type employing ionizable mediums are represented in Fig. 6 of the accompanying drawings. The curve H may be employed to represent the potential impressed between the anode 29 and cathode 30 of electric valve 28 and the dotted curve J may be employed to represent the control characteristic of the electric valve, that is, the potential which must be impressed on the control member 31 in order to render the electric valve conductive. If the curve K represents the voltage impressed on the control member 31, it will be apparent that the electric valve 28 will be rendered conductive at time $a$ where the control member potential curve J intersects the control characteristic K. The electric valve 28 will conduct current corresponding to the shaded portions shown in diagram I of Fig. 6. As the phase of the potential K impressed on the control member 31 is advanced relative to the potential impressed on the anode 29, the electric valve will be rendered conductive so that a larger average current is conducted corresponding to the shaded areas shown in diagram II of Fig. 6. Where there is substantial phase coincidence between the voltage impressed on the anode 29 and the control member 31, as represented in diagram III of Fig. 6, the electric valve 28 will be conductive during the entire positive half cycle so that the average current conducted is maximum. Conversely, when there is substantial phase opposition between the potentials impressed on the anode 29 and control member 31, the average current conducted by the electric valve 28 will be substantially zero.

The general principles of operation of the electric valve voltage regulating system diagrammatically shown in Fig. 1 will now be considered. The critical voltage of the non-linear bridge is chosen so that it is substantially equal to the rated terminal voltage of the dynamo-electric machine 1. Therefore, the output voltage of the network 5 is in the region corresponding to the line BC of curve A in Fig. 3. This output voltage will be large when the terminal voltage is slightly smaller or greater than the critical voltage. The total change in terminal voltage required to produce a large variation in the output voltage of the non-linear network is very small, thus making the voltage regulating system particularly applicable to those arrangements in which it is desirable to maintain a precise voltage regulation. The variable resistance 35 connected in the field circuit of dynamo-electric machine 1 is adjusted so that, at full load on the dynamo-electric machine 1 and with the regulator disconnected, the terminal voltage is several volts above the rated value. Let it be assumed that the voltage of the alternating current circuit 4 tends to increase above the range established by the non-linear net-work 5. A slight increase in voltage of the alternating current circuit 4 will cause the output voltage of the network 5 to increase in a negative direction to the region above the portion BC of curve A in Fig. 3, causing electric valves 17 and 18 to conduct a smaller amount of current effecting thereby an advancement in phase of the potential impressed on control member 31 of electric valve 28. This advancement in phase of the control potential impressed on control member 31 will effect an increase in the average current conducted by electric valve 28. The circuit through which the output current of electric valve 28 flows includes cathode 30, the right-hand portion of secondary winding 25 of transformer 23, conductor 37, resistance 35, conductor 36 and anode 29 of electric valve 28. The increase in current conducted by electric valve 28 will effect a decrease in the current supplied to field winding 3 of dynamo-electric machine 1 by increasing the voltage drop across the resistance 35. This decrease in field current is caused by the differential effect of the current supplied to variable resistance 35 by electric valve 28 and the current which is supplied to the field circuit by the direct current source 34. As a result, the excitation of machine 1 will be decreased to maintain the terminal voltage at the predetermined value. Conversely, if the voltage of the alternating current circuit 4 decreases to a value slightly below the region corresponding to the portion BC of curve A in Fig. 3, the voltage impressed on the control members 21 of electric valves 17 and 18 will become less negative effecting thereby an increase in the current which these electric valves conduct. This increase in current, or in other words, this decrease in the effective value in the resistance which electric valves 17 and 18 offer to the flow of current in the phase shifting circuit 16, occasions a retardation in the phase of the potential impressed on the control member 31 of electric valve 28 causing an increase in the current of field winding 3 by virtue of the coincident decrease in the potential appearing across resistance 35. This increase in the excitation of dynamo-electric machine 1 tends to maintain the terminal voltage substantially constant.

In Fig. 7 of the accompanying drawings, curve L represents the variation of the terminal voltage of the dynamo-electric machine 1 under varying load conditions without the use of the regulating system shown in Fig. 1, and curve M represents the terminal voltage of the machine 1 with the electric valve regulator functioning to maintain a substantially constant voltage. Curve N represents the variation of the current in the field winding 3 with the regulator functioning to maintain a substantially constant voltage and curve P represents the variation of the current conducted by electric valve 28 when the electric valve regulator is functioning to maintain a substantially constant output voltage.

It is to be noted that by virtue of the highly sensitive voltage characteristic of the non-linear resonant network 5, the electric valve voltage regulating system described above is extremely sensitive to slight variations in terminal voltage of the alternating current circuit 4 or the output voltage of the dynamo-electric machine 1. Furthermore, since the electric valves 17 and 18 in the phase shifting circuit 16 serve as a variable resistance, the magnitude of which may be varied within a wide range, the degree and smoothness of control is advantageous in applications where rapid response and precision of operation are required.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a dynamo-electric machine having an armature winding connected to said alternating current circuit and having a field winding, a direct current circuit for energizing said field winding, a non-linear resonant circuit energized from said alternating current circuit and being arranged to provide an electrical quantity which varies in a predetermined manner within a predetermined range of an electrical condition of said alternating current circuit, a source of alternating current, an electric valve means having a control member and being connected between said source and said direct current circuit for controlling said direct current circuit, a phase shifting circuit responsive to said electrical quantity and being connected between said resonant circuit and said valve means for impressing on said control member a potential variable in phase relative to the voltage of said source to control the conductivity of said electric valve means to maintain said electrical condition within said predetermined range.

2. In combination, an alternating current circuit, a dynamo-electric machine having an armature winding connected to said alternating current circuit and having a field winding, a direct current circuit for energizing said field winding, a non-linear resonant circuit energized from said alternating current circuit and being arranged to provide an electrical quantity which varies in a predetermined manner within a predetermined range of an electrical condition, of said alternating current circuit, a source of current, an electric valve means connected between said source and said direct current circuit for controlling said direct current circuit, a phase shifting circuit including an electric valve having a control member and being connected between said resonant circuit and said electric valve means for controlling said electric valve means, and means for impressing said electrical quantity on said control member of said second mentioned electric valve to maintain said electrical condition within predetermined range.

3. In combination, an alternating current circuit, a dynamo-electric machine having an armature winding connected to said alternating current circuit and having a field winding, a direct current circuit for energizing said field winding, a non-linear resonant network of the bridge type energized from said alternating current circuit and being arranged to provide an electrical quantity which varies in a predetermined manner within a predetermined range of voltage of said alternating current circuit, a source of alternating current, an electric valve means having a control member and being connected between said source and said direct current circuit for controlling said direct current to effect control of the energization of said field winding, a phase shifting circuit responsive to said electrical quantity and being connected between said network and said valve means for impressing on said control member a potential variable in phase relative to the voltage of said source to control the conductivity of said electric valve means to maintain the voltage of said alternating current circuit within said predetermined range.

4. In combination, an alternating current circuit, a dynamo-electric machine having an armature winding connected to said alternating current circuit and having a field winding, a direct current circuit for energizing said field winding, a non-linear resonant network of the bridge type energized from said alternating current circuit and being arranged to provide an abruptly varying electrical quantity within a predetermined range of the voltage of said alternating current circuit, a source of alternating current, an electric valve means having a control member and being connected between said source and said direct current circuit to control the current in said direct current circuit, a phase shifting circuit responsive to said electrical quantity and being connected between said network and said valve means for impressing on said control member a potential variable in phase relative to the voltage of said source to control the conductivity of said electric valve means to maintain the voltage of said alternating current circuit within said predetermined range.

5. In combination with an electrical system, a direct current circuit, means for adjusting the current in said circuit to a predetermined value comprising an alternating current circuit and an electric valve means connected between said alternating current circuit and said direct current circuit, a phase shifting circuit for controlling the conductivity of said electric valve means, and means including a non-linear resonant circuit for controlling said phase shifting circuit to control the current in said direct current circuit in accordance with a controlling influence.

6. In combination, an alternating current circuit, a second circuit to be controlled in accordance with an electrical condition of said alternating current circuit, a non-linear resonant circuit energized from said alternating current circuit for providing an electrical quantity responsive to said electrical condition, a source of alternating current, an electric valve means having a control member and being connected between said source and said second circuit for controlling said second circuit, and a phase shifting circuit responsive to said electrical quantity and being connected between said resonant circuit and said valve means for impressing on said control member a potential variable in phase relative to the voltage of said source to control the conductivity of said electric valve means in accordance with said electrical condition.

7. In combination, an alternating current circuit, a direct current circuit, and means for controlling said direct current circuit in accordance with a predetermined electrical condition of said alternating current circuit comprising a non-linear resonant circuit energized from said alternating current circuit for providing an electrical quantity responsive to said predetermined electrical condition of said alternating current circuit, a source of alternating current, an electric valve means having a control member and being connected between said source and said direct current circuit for controlling an electrical condition of said direct current circuit and a phase shifting circuit responsive to said electrical quantity and being connected between said resonant circuit and said valve means for impressing on said control member a potential variable in phase relative to the voltage of said source to control the conductivity of said electric valve means.

8. In combination, an alternating current circuit, a direct current circuit, a source of direct current for energizing said direct current circuit, means for controlling the current in said direct current circuit, and means for controlling said first mentioned means in accordance with the voltage of said alternating current circuit comprising a non-linear resonant network of the bridge type energized from said alternating current circuit for providing an electrical quantity responsive to the voltage of said alternating current circuit, a source of alternating current, an electric valve means having a control member and being connected between said source and said first mentioned means for controlling the energization of said first mentioned means and a phase shifting circuit responsive to said electrical quantity and being connected between said network and said valve means for impressing on said control member a potential variable in phase relative to the voltage of said source to control the conductivity of said electric valve means.

9. In combination, an alternating current circuit, a direct current circuit, and means for controlling said direct current circuit in accordance with a predetermined electrical condition of said alternating current circuit comprising a non-linear resonant network of the bridge type energized from said alternating current circuit for providing an electrical quantity responsive to said predetermined electrical condition of said alternating current circuit, a source of alternating current, an electric valve means having a control member and being connected between said source and said direct current circuit for controlling an electrical quantity of said direct current circuit and a phase shifting circuit connected between said network and said valve including an electric valve for impressing on said control member a potential to control the conductivity of said first mentioned electric valve means in accordance with said first mentioned electrical quantity.

10. In combination, an alternating current circuit, a direct current circuit, and means for controlling said direct current circuit in accordance with a predetermined electrical condition of said alternating current circuit comprising a non-linear resonant circuit of the bridge type energized from said alternating current circuit for providing an electrical quantity responsive to said predetermined electrical condition of said alternating current circuit, a source of alternating current, an electric valve means having a control member and being connected between said source and said direct current circuit for controlling an electrical condition of said direct current circuit and a phase shifting circuit connected between said network and said valve means including an electric valve having a control member energized in accordance with said electrical quantity for impressing on said control member of said first mentioned electric valve means a potential variable in phase relative to the voltage of said source to control the conductivity of said first mentioned electric valve means in accordance with said electrical condition of said alternating current circuit.

11. In combination, an alternating current circuit, a non-linear resonant circuit connected to be energized from said alternating current circuit for providing an electrical quantity critically responsive to a predetermined range of an electrical condition of said alternating current circuit, control means for providing a potential variable in phase relative to a potential of said alternating current circuit in accordance with said electrical condition comprising an impedance type phase shifting circuit including a serially-connected variable reactance element and a resistance element, said resistance element being responsive to said electrical quantity, and means responsive to said control means.

12. In combination, an alternating current circuit, a non-linear resonant circuit energized from said alternating current circuit for providing an electrical quantity critically responsive to a predetermined range of an electrical condition of said circuit, control means for providing a potential variable in phase in accordance with said electrical condition comprising a phase shifting circuit of the impedance type including a source of alternating potential, a serially-connected capacitance and a variable resistance element connected across said source, said resistance element being responsive to said electrical quantity, and means responsive to said control means.

13. In combination, an alternating current circuit, a second alternating current circuit, a non-linear resonant network of the bridge type energized from said first mentioned alternating current circuit for providing an electrical quantity critically responsive to a predetermined range of an electrical condition of said first mentioned circuit, and means for providing a potential variable in phase relative to the potential of said second mentioned alternating current circuit comprising a phase shifting circuit of the impedance type including a serially-connected capacitance and electric valve means connected across said second circuit, said electric valve means being arranged to control the phase of said first mentioned potential in accordance with said electrical quantity.

14. In combination, an alternating current circuit, a non-linear resonant network of the bridge type energized from said alternating current circuit for providing an electrical quantity critically responsive to a predetermined range of an electrical condition of said circuit, and means for providing a potential variable in phase in accordance with said electrical condition comprising a phase shifting circuit of the impedance type including a source of alternating potential, a serially-connected capacitance and electric valve means having a control member, said means being arranged to energize said control member of said electric valve means to control the conductivity of said valve in accordance with said electrical quantity to effect control of the phase of said first mentioned potential.

15. In combination, a source of alternating potential including a winding having terminal connections and a connection electrically itermediate said termial connections, a serially-connected reactance element and an electric valve means connected across said terminal connections, a direct current circuit, a second electric valve means, and means for controlling the conductivity of said first mentioned electric valve means for obtaining between said intermediate connection and the common juncture of said element and said valve means a potential variable in phase relative to the potential of said source for controlling the conductivity of said second electric valve means to control the energization of said direct current circuit.

16. In combination, a source of alternating potential including a winding having terminal connections and a connection electrically itermediate said termial connections, a serially-connected capacitance and a pair of oppositely disposed electric valves of the high vacuum type connected across said terminal connections, a direct current circuit, a second electric valve, electric valve means for energizing said direct current circuit from said source through a portion of the winding, and means for controlling the conductivity of said first mentioned electric valves for obtaining between said intermediate connection and the common juncture of said capacitance and said electric valves a potential variable in phase relative to the potential of said source for controlling the energization of said second mentioned electric valve means to control the energization of said direct current circuit.

WILLIAM E. JACOBSEN.

CERTIFICATE OF CORRECTION.

Patent No. 2,158,871.     May 16, 1939.

WILLIAM E. JACOBSEN.

It is hereby certified that error appears in the printed specification of the above numbered patent requiring correction as follows: Page 1, first column, line 8, for the word "system" read systems; page 2, first column, line 5, for "serves" read serve; page 3, second column, line 49, after the word "effect" strike out the hyphen; page 6, first column, lines 20 and 21, claim 15, for "itermediate said termial" read intermediate said terminal; same page, second column, line 16, claim 16, for "the" read said; and that the said Letters Patent should be read with this correction therein that the same may conform to the record of the case in the Patent Office.

Signed and sealed this 11th day of July, A. D. 1939.

Henry Van Arsdale (Seal)            Acting Commissioner of Patents.